United States Patent Office 3,306,555
Patented Feb. 28, 1967

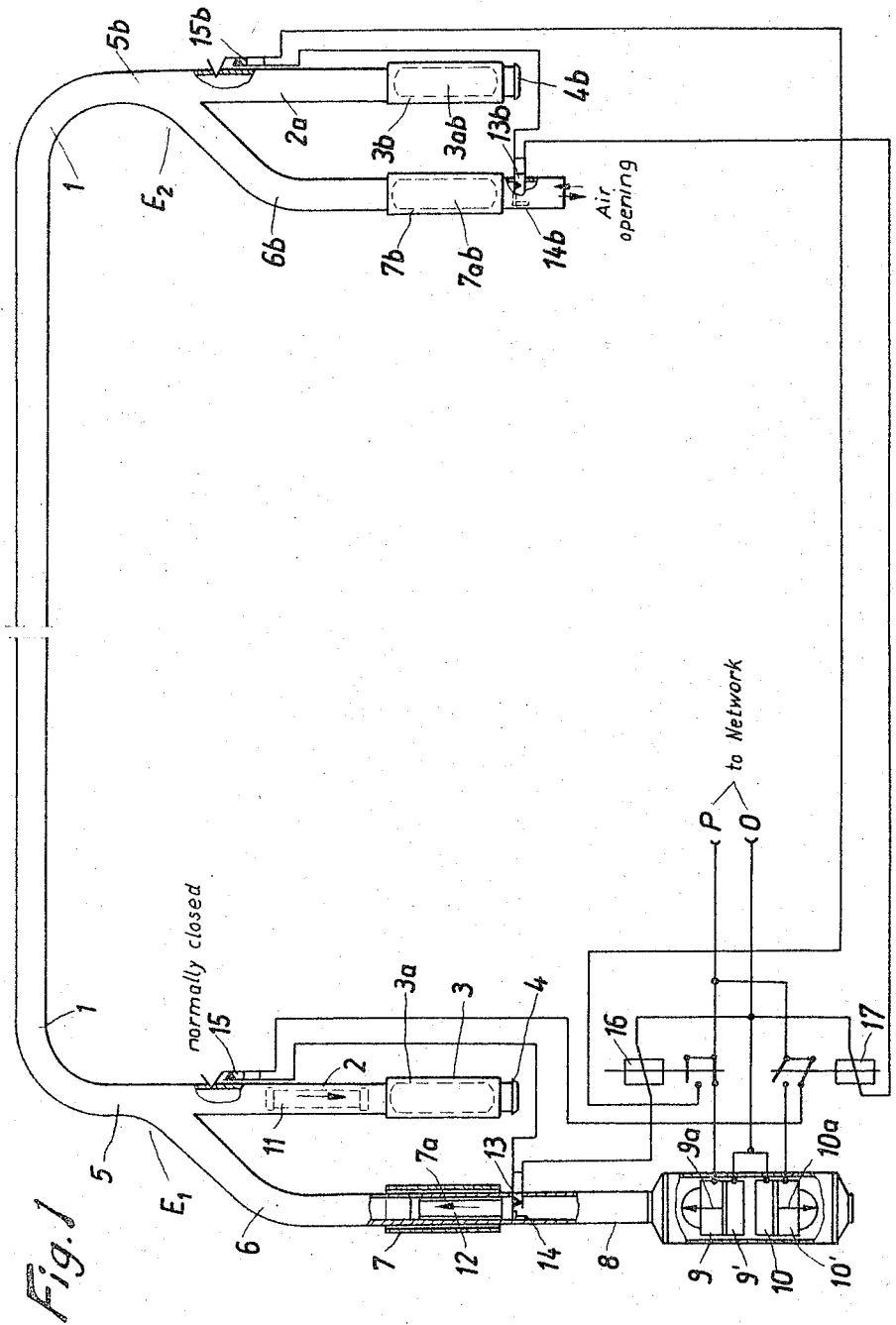

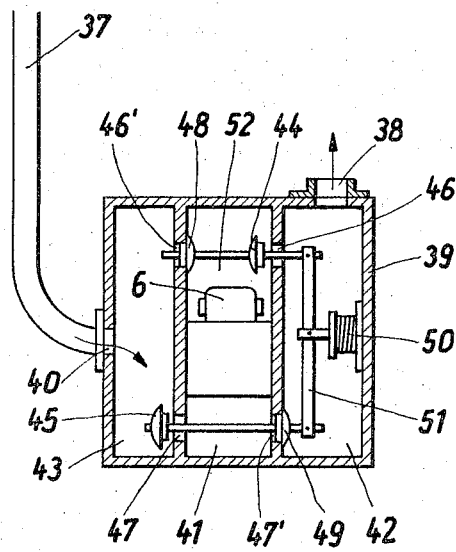

3,306,555
PNEUMATIC TUBE STATION
Friedrich Tonne, Robert-Haug-Weg 9,
Stuttgart N, Germany
Filed Aug. 19, 1964, Ser. No. 390,541
Claims priority, application Germany, Aug. 21, 1963,
T 24,535
6 Claims. (Cl. 243—19)

The present invention relates to a pneumatic tube station with reversing operation. With simple pneumatic tube installations which are operated with a tube in reversing operation, it is necessary, prior to the dispatching of a dispatch tube to wait until the respective traffic has been cleared. In case of arriving, i.e. foreign dispatch tubes, which are on their way to their own station, the arrival of such dispatch tubes has first to be awaited. Only then can a dispatch tube be sent off in the opposite direction. This arrangement is disadvantageous, particularly with long conveying tubes, inasmuch as the dispatch tube requires a longer period of time to reach its goal so that undesired waiting periods are involved.

There have also become known automatic dispatch devices which form a branch laterally leading into the conveying tube without being passed through by actuating air, and which are adapted to receive a dispatch tube to be dispatched. Normally, the dispatch is effected by the release of a magnetically operable holding lever and requires a certain amount of work by the electric system. For this reason, such constructions have heretofore not been employed with simple and inexpensive pneumatic tube installations.

It is, therefore, an object of the present invention to provide an arrangement in a pneumatic tube system of the general type set forth above which will make it possible at any time to insert a dispatch tube to be dispatched in spite of existing counter traffic.

It is a further object of this invention to provide an arrangement as set forth in the preceding paragraph, in which after the counter traffic has reached its end, the inserted tube will automatically be dispatched.

It is a still further object of this invention to design the mechanical and electrical means for the said dispatch and receiving station in such a simple way that the system can be employed economically also with very small installations.

These and other objects and advantages of the invention will appear more clearly from the following specification in connection with the accompanying drawings, in which FIG. 1 illustrates a pneumatic tube system according to the present invention.

FIG. 1a illustrates a reversible valve and a blower for use in connection with the present invention.

The pneumatic tube station for reverse operation according to the present invention is characterized primarily in that the conveying tube is subdivided into a receiving and a dispatch section.

Referring now to the drawing in detail, the conveying tube is designated with the reference numeral 1. At $E_1$, a bent section 6 branches off from the straight end section 2 of the conveying tube 1. As will be seen from the drawing, end section 2 comprises an opening 3a adapted selectively to be closed and opened by manipulation of a slidable sleeve 3 while the free end of said section 2 is provided with a closed cap 4. The bent tube section 6 is similarly provided with an opening 7a adapted selectively to be closed and opened by manipulation of a sleeve 7. Below said opening 7a there is provided a barrier or abutment 14 which, when occupying its effective position, prevents a dispatch tube 12 adjacent thereto from sliding further downwardly.

Tube section 6 extends further downwardly beyond said abutment 14 and forms a tubular portion 8 which leads to a blower. The blower itself comprises two motors 9′ and 10′. The upper motor 9′ when drivingly connected to the blower causes the latter to furnish compressed air for the tubes to be dispatched as, for instance tube 12. When the lower motor 10′ is drivingly connected to the blower, the latter functions as suction blower producing a suction for the oncoming dispatch tubes, the suction air being drawn through motor 9′. Arrow 9a indicates the direction of the compressed air which transports dispatch tube 12 away from the loading station 7a, 7, whereas arrow 10a indicates the direction of the suction air for the oncoming dispatch tubes.

The end station located at the other end $E_2$ of the conveying tube 1 is designed similarly to the station at the end $E_1$. However, the station at the end $E_2$ does not have an extension pipe corresponding to tube 8. Moreover, motors 9′ and 10′ may be omitted. The individual parts at the station at $E_2$ have, therefore, been designated with the same reference numerals as at the end $E_1$ but with the additional letter $b$.

It is also possible so to design the blower installation that at each end $E_1$, $E_2$ of the arrangement there is either a suction or a pressure blower, or the pressure or suction air flow is produced by a reversible valve in cooperation with a single blower.

Such an arrangement is shown in FIG. 1a. A blower 60 is mounted in a casing 39 in such a way that the plant and, therefore, the tube section 6 may by means of an electric control device 50 in casing 39 selectively be placed under pressure or under suction. Blower 60 communicates with section 6 through an air conduit 37. In order to make possible that with alternating direction of movement of the dispatch tube the latter may be moved selectively by pressure or by means of a suction effect, there is in conformity with the present invention provided a simple reversing device for the air current taken in by the blower. This control or reversing device comprises two pairs of valves coupled to each other which, depending on their position, connect the intake or suction side of the blower either with the opening 38 leading into the atmosphere and provided in casing 39, or with an opening 40 leading to the air conduit 37.

Blower casing 39 as illustrated for example in FIG. 1a has been sub-divided into four chambers 41, 42, 43 and 52. In the intermediate chambers 41 and 52 there is arranged the blower 60 having its intake or suction side directed downwardly and its outlet or pressure side directed upwardly. By means of the pairs of valves 44, 45, the openings 46 and 47, and by means of the valve pairs 48 and 49, the diametrically oppositely located openings 46′ and 47′ are opened respectively. All four valves are by means of a lever system 51 positively coupled to each other.

The outlet opening of blower 60 in the chamber 32 is, in the particular position shown in FIG. 1a through opening 46 in communication with the opening 38 leading into the atmosphere. Thus, air is drawn in through air conduit 37 in the direction shown by the arrow and is blown toward the outside through opening 38.

When the valves 48 and 49 are open while the valves 44 and 45 are closed, the discharge opening in chamber 52 communicates with chamber 43 and thereby with the air conduit 37. The blower will then blow air into the pneumatic tube plant which will thus be under pressure, while air from the outside is drawn in by the blower through opening 38 and chamber 42 through opening 47'.

It is characteristc for the present invention that the driving air for conveying the respective dispatch tube 12 is at the end stations $E_1$, $E_2$ passed through the laterally branched-off bent tube section 6. In this way, an oncoming dispatch tube 11 follows the straight course of the end of conveying tube 1, i.e. is moved into the closed tube section 2 where it will be deposited while being cushioned by the air displaced ahead of said dispatch tube 11 and finally trapped in section 2. This dispatch tube 11 may then be withdrawn from section 2 through opening 3a by manipulating slidng sleeve 3 accordingly.

A dispatch tube 12 to be dispatched is introduced into section 6 through opening 7a after corresponding manipulation of sleeve 7. Following the closing of said opening 7a by sleeve 7, the blower is operated as pressure blower so that the compressed air is conveyed in the direction of the arrow 9a and while acting upon dispatch tube 12 moves the latter through the bent portion of section 6 into the conveying tube 1. Inasmuch as section 2 is closed by cap 4 and sleeve 3, the total air pressure delivered by the blower is available for conveying dispatch tube 12 through conveying tube 1.

The slideable sleeve 7 and the diameter of the pipe section associated therewith are so selected that within the range of the sliding sleeve between dispatch tube 12 and tube section 6 there will prevail a sufficient tolerance, especially in the bent tube section 6, that the drivng air of the oncoming dispatch tube 11 will be able to pass by a dispatch tube 12 inserted at 7 without losing too much energy. With a corresponding design of the blowers 9 and 10, this will cause no difficulties.

Below that area where the tube 12 to be dispatched is inserted and rests on abutment 14a, there is provided a switch 13 operable by the weight of a dispatch tube 12. This switch 13 controls a delayed release relay 16 which in its turn controls the pressure blower 9 after the suction blower 10 has been turned off. This is effected by a mutual interlock of two time relays 16, 17 of which time relay 16 is associated with the pressure blower, whereas time relay 17 is associated with the suction blower.

As soon as the arriving dispatch tube 11 has entered the receiving station or section 2, and as soon as the suction blower 10 has been turned off through the intervention of its time relay 17, time relay 16 controlling pressure blower 9 is actuated by switch 13. Pressure blower 9 now runs for the duration of the timer associated with relay 16 and produces compressed air which moves dispatch tube 12 upwardly and through section 6 and tube 1 to the receiving station 2a. At said receivng station 2a, the arriving dispatch tube and further arriving dispatch tubes may rest until they are withdrawn therefrom without interfering with the dispatch of a dispatch tube 12.

If desired, switch 13 may also be controlled through the intervention of a rest contact 15 which interrupts the circuit when tube section 2 is filled. In this way, disturbances will be prevented which otherwise might occur by the collision of dispatch tubes passing from branch 6 into tube 1 with tubes received by station 2 and extending into the path of the dispatch tubes leaving section 6.

It is, of course, to be understood, that the present invention is, by no means, limited to the particular arrangement shown in the drawing, but also comprises any modifications within the scope of the appended claims. Thus, the closed receiving station 2 may also lead into a closed housing provided with discharge openings adapted selectively to be opened and closed, the arrivng dispatch tubes 11 then collecting in said housing.

Depending on the length of the bent section 6, it is, of course, possible to insert a plurality of dispatch tubes 12 into section 6 and have them remain therein in superimposed condition until they are being dispatched.

What I claim is:

1. In a pneumatic tube installation: a conveying pipe having a main section adapted to convey dispatch tubes therethrough and comprising both a first and a second end section each including a receiving compartment for receiving dispatch tubes passed through said main section and also including pipe means connecting the respective receiving compartment with said main section, two additional pipe sections respectively branching off from said first and second end sections at such an angle that a dispatch tube passing from said main section toward either one of said first and second end sections will encounter less resistance when entering the respective end section than when trying to enter said additional pipe sections, each of said additional pipe sections including a dispatch compartment for dispatching dispatch tubes through said main section to the respective remote receiving compartment, the pipe means of each end section which connects the respective receiving compartment with said main section by-passing the respective adjacent dispatch compartment whereby a dispatch tube conveyed through said main section passes into a receiving compartment without passing through the respective adjacent dispatch compartment, and blower means arranged in series with a dispatch compartment only and located ahead thereof when looking in the direction of movement of a dispatch tube from said last mentioned dispatch compartment to said main pipe section.

2. An arrangement according to claim 1, in which each of said dispatch and receiving sections is provided with an opening having associated therewith sleeve means for respectively opening and closing said opening.

3. A pneumatic tube installation according to claim 1, which includes control switch means operatively connected to said blower means for controlling operation of the latter, said control switch means being controllable by a dispatch tube inserted into either one of said dispatch compartments.

4. A pneumatic tube installation according to claim 3, which includes: electric motor means operatively connected to said blower means for actuating the same, electric circuit means connected to said motor means and including switch means arranged in both said dispatch compartments and operable by the insertion of a dispatch tube into either one of said dispatch compartments, and additional switch means arranged in said circuit means and operable in response to either one of said receiving compartments being filled to interrupt said circuit means to thereby prevent said blower means from furnishing compressed air to the respective dispatch compartment communicating therewith.

5. In a pneumatic tube installation: a conveying tube, each end of said conveying tube being branched into a first section forming a dispatch section and into a second section forming a receiving section, blower means associated with one of said dispatch sections and operable selectively to convey compressed air to said one dispatch section or to create a suction effect in said one dispatch section and said conveying tube, first motor means associated with said blower means for operating the same as compressed air furnishing blower, second motor means associated with said blower means for operating the same as a suction blower, electric circuit means electrically connected to said first and second motor means and including switch means arranged at both of said dispatch sections and adapted to be closed by a dispatch tube inserted into either one of said dispatch sections, and relay means likewise arranged in said circuit means and respectively associated with said first and second motor means and interlocked so as to prevent energization of one of said motor means prior to the deenergization of said other motor means.

6. An arrangement according to claim 5, in which said circuit means includes additional switch means respectively arranged in each of said receiving sections, one of said relay means forming a delayed release relay associated with said switch means at said dispatch sections, while the other relay means is designed as a delayed release relay associated with said additional switch means.

References Cited by the Examiner

UNITED STATES PATENTS

| | | | |
|---|---|---|---|
| 734,540 | 7/1903 | Gray | 243—2 |
| 974,799 | 11/1910 | Jacques | 243—7 |
| 1,172,598 | 2/1916 | Jacques | 243—7 |
| 1,248,658 | 12/1917 | Hidden | 243—7 |
| 1,248,767 | 12/1917 | Whittier | 243—1 |
| 1,963,779 | 6/1934 | Cutting | 243—1 |

SAMUEL F. COLEMAN, *Primary Examiner.*